(12) United States Patent
Zeng

(10) Patent No.: US 8,807,862 B2
(45) Date of Patent: Aug. 19, 2014

(54) STROLLER AND ADJUSTING MECHANISM THEREOF

(75) Inventor: Hai-Bo Zeng, Taipei (TW)

(73) Assignee: Wonderland Nurserygoods Company Limited, Hong Kong (HK)

( * ) Notice: Subject to any disclaimer, the term of this patent is extended or adjusted under 35 U.S.C. 154(b) by 538 days.

(21) Appl. No.: 12/817,058

(22) Filed: Jun. 16, 2010

(65) Prior Publication Data

US 2011/0027010 A1   Feb. 3, 2011

(30) Foreign Application Priority Data

Jul. 31, 2009   (CN) .......................... 2009 1 0160938

(51) Int. Cl.

| | | |
|---|---|---|
| F16C 11/00 | (2006.01) | |
| B62B 9/00 | (2006.01) | |
| B62B 9/12 | (2006.01) | |
| B62B 9/20 | (2006.01) | |
| B62B 9/26 | (2006.01) | |
| B62B 3/08 | (2006.01) | |

(52) U.S. Cl.
CPC ... *B62B 9/20* (2013.01); *B62B 9/00* (2013.01); *B62B 2205/20* (2013.01); *B62B 9/12* (2013.01); *B62B 9/26* (2013.01); *B62B 9/203* (2013.01); *B62B 3/08* (2013.01); *B62B 2202/023* (2013.01)
USPC ........................................................ 403/93

(58) Field of Classification Search
USPC .................. 403/91, 92, 93, 96, 97, 103, 113; 280/650; 224/197, 409, 198, 199, 431, 224/441, 443; 220/345.1, 345.4, 737, 694; 248/310, 311.2, 316.7

See application file for complete search history.

(56) References Cited

U.S. PATENT DOCUMENTS

| | | | | |
|---|---|---|---|---|
| 3,570,325 A | * | 3/1971 | Kroll et al. ...................... | 74/527 |
| 2005/0258620 A1 | * | 11/2005 | Pike et al. ...................... | 280/647 |
| 2010/0276909 A1 | * | 11/2010 | Liu ................................ | 280/650 |

* cited by examiner

*Primary Examiner* — Michael P Ferguson
*Assistant Examiner* — Daniel Wiley
(74) *Attorney, Agent, or Firm* — Andrew S. Baluch; Foley & Lardner LLP

(57) ABSTRACT

A stroller includes a handle switchable between a front inclined position and a rear inclined position, an article holding accessory, and at least one adjusting mechanism. The adjusting mechanism includes a sleeve component secured to the handle, an axle ring component connected to the article holding accessory and coupled rotatably to the sleeve component, and a positioning plate. The axle ring component has first and second engaging parts corresponding to the front and rear inclined positions, respectively. The positioning plate is coaxially secured in the sleeve component and has a positioning part engageable with a selected one of the first and second engaging parts with respect to an axis of rotation of the axle ring component, so as to provide a substantially horizontal position of use for the article holding accessory when the handle is at either one of the front and rear inclined positions.

19 Claims, 9 Drawing Sheets

STROLLER AND ADJUSTING MECHANISM THEREOF

CROSS-REFERENCE TO RELATED APPLICATION

This application claims priority of Chinese Application No. 200910160938.9, filed on Jul. 31, 2009.

BACKGROUND OF THE INVENTION

1. Field of the Invention

The present invention relates to an adjusting mechanism, more particularly to an adjusting mechanism for an article holding accessory of a stroller.

2. Description of the Related Art

Currently, there is available a type of baby stroller having a handle switchable between a front inclined position and a rear inclined position. When the handle is at the front inclined position, the child occupying the stroller and the person pushing the stroller face each other, and when the handle is at the rear inclined position, both the child and the person face the direction in which the stroller is pushed. Accordingly, the position of the handle may be adjusted as needed.

However, in such baby strollers, when an article holding accessory is secured to the handle and moves therewith, the article holding accessory is unable to maintain a substantially horizontal position once the handle is switched to the other one of the two positions.

U.S. Pat. No. 6,368,006 discloses an attachment mechanism for connecting a stroller tray accessory to a stroller handle and capable of maintaining the tray accessory substantially horizontal in either one of front and rear inclined positions of the stroller handle.

SUMMARY OF THE INVENTION

An object of the present invention is to provide a stroller having an adjusting mechanism that permits securing of an article holding accessory to a handle, and that permits position adjustment of the article holding accessory relative to the handle.

Another object of the present invention is to provide an adjusting mechanism for securing an article holding accessory to a handle in a modular manner, and for position adjustment of the article holding accessory relative to the handle.

The stroller of this invention includes a handle switchable between a front inclined position and a rear inclined position. The stroller further includes an article holding accessory and at least one adjusting mechanism. The adjusting mechanism includes a sleeve component, an axle ring component, and a positioning plate. The sleeve component is secured to the handle. The axle ring component is connected to the article holding accessory and is coupled rotatably to the sleeve component. The axle ring component has a first engaging part and a second engaging part corresponding respectively to the front inclined position and the rear inclined position. The positioning plate is coaxially secured in the sleeve component. The positioning plate has a positioning part engageable with a selected one of the first engaging part and the second engaging part in a radial direction with respect to an axis of rotation of the axle ring component, such that the article holding accessory is at a substantially horizontal position of use when the handle is at either one of the front inclined position and the rear inclined position.

Preferably, the axle ring component is connected separably to an outer end of the article holding accessory.

Preferably, each of the first engaging part and the second engaging part of the axle ring component is one of an engaging recess and an engaging protrusion, and the positioning part of the positioning plate is the other of the engaging recess and the engaging protrusion that corresponds to the first engaging part and the second engaging part.

Preferably, the axle ring component includes a surrounding wall for receiving the positioning plate. The first engaging part and the second engaging part are formed at an inner face of the surrounding wall.

Preferably, the sleeve component further includes a protruding pillar protruding toward the axle ring component. The positioning plate is provided with a hole through which the protruding pillar extends.

Preferably, the axle ring component includes a limiting protrusion protruding toward the sleeve component. The positioning plate is formed with a limiting opening through which the limiting protrusion extends. The limiting protrusion is disposed in one of two opposite ends of the limiting opening when the positioning part of the positioning plate engages the first engaging part of the axle ring component and in the other of the two opposite ends of the limiting opening when the positioning part of the positioning plate engages the second engaging part of the axle ring component.

Preferably, the positioning plate includes a plate body and a resilient arm having two ends connected to the plate body. The plate body and the resilient arm cooperate to define the limiting opening. The positioning part is disposed on one side of the resilient arm opposite to the limiting opening.

Preferably, the axle ring component has one side that is away from the sleeve component and that is provided with a key member, and the article holding accessory has a keyway for engaging the key member.

Preferably, the axle ring component has two of the first engaging parts that are respectively disposed at two diametrically opposite positions, and two of the second engaging parts that are respectively disposed at another two diametrically opposite positions. The positioning plate has two of the positioning parts that are disposed at two diametrically opposite positions of the positioning plate.

Preferably, the axle ring component is riveted rotatably to the sleeve component.

Preferably, the axle ring component has a latch member. The article holding accessory has a resilient piece that has a latch hole corresponding to the latch member. The latch member engages the latch hole when the article holding accessory is disposed on the handle.

The adjusting mechanism of the present invention is the adjusting mechanism of the stroller described hereinabove.

The present invention, through the arrangement of the positioning part of the positioning plate that is engageable with a selected one of the first engaging part and the second engaging part of the axle ring component, provides a substantially horizontal position of use for the article holding accessory when the handle is at either one of the front and rear inclined positions. Moreover, the design, in which the axle ring component is coupled separably to the outer end of the article holding accessory, allows the article holding accessory to be secured to the handle in a modular manner and allows the user to remove the article holding accessory when desired.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
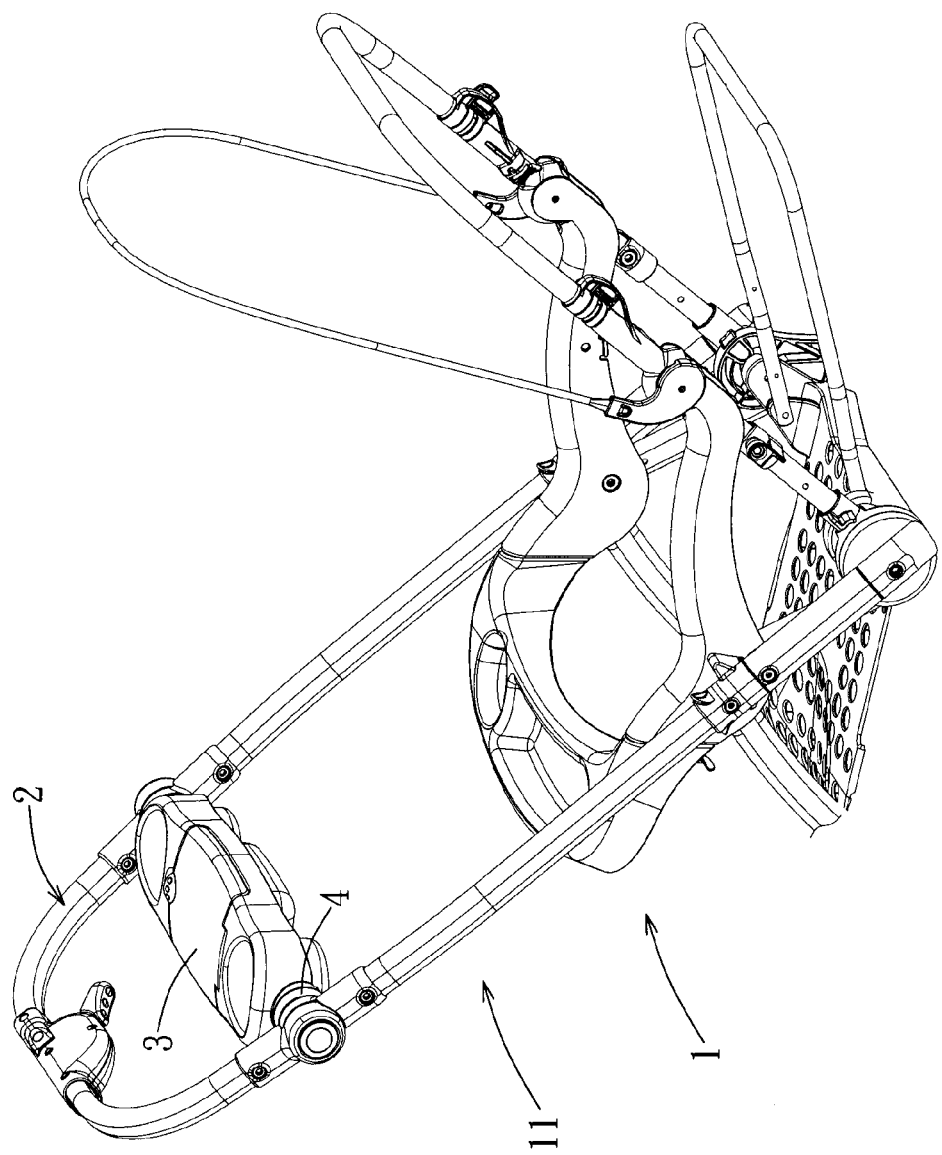
FIG. 1 is a perspective view of the stroller of the preferred embodiment with a handle thereof at a front inclined position.
Figure 2:
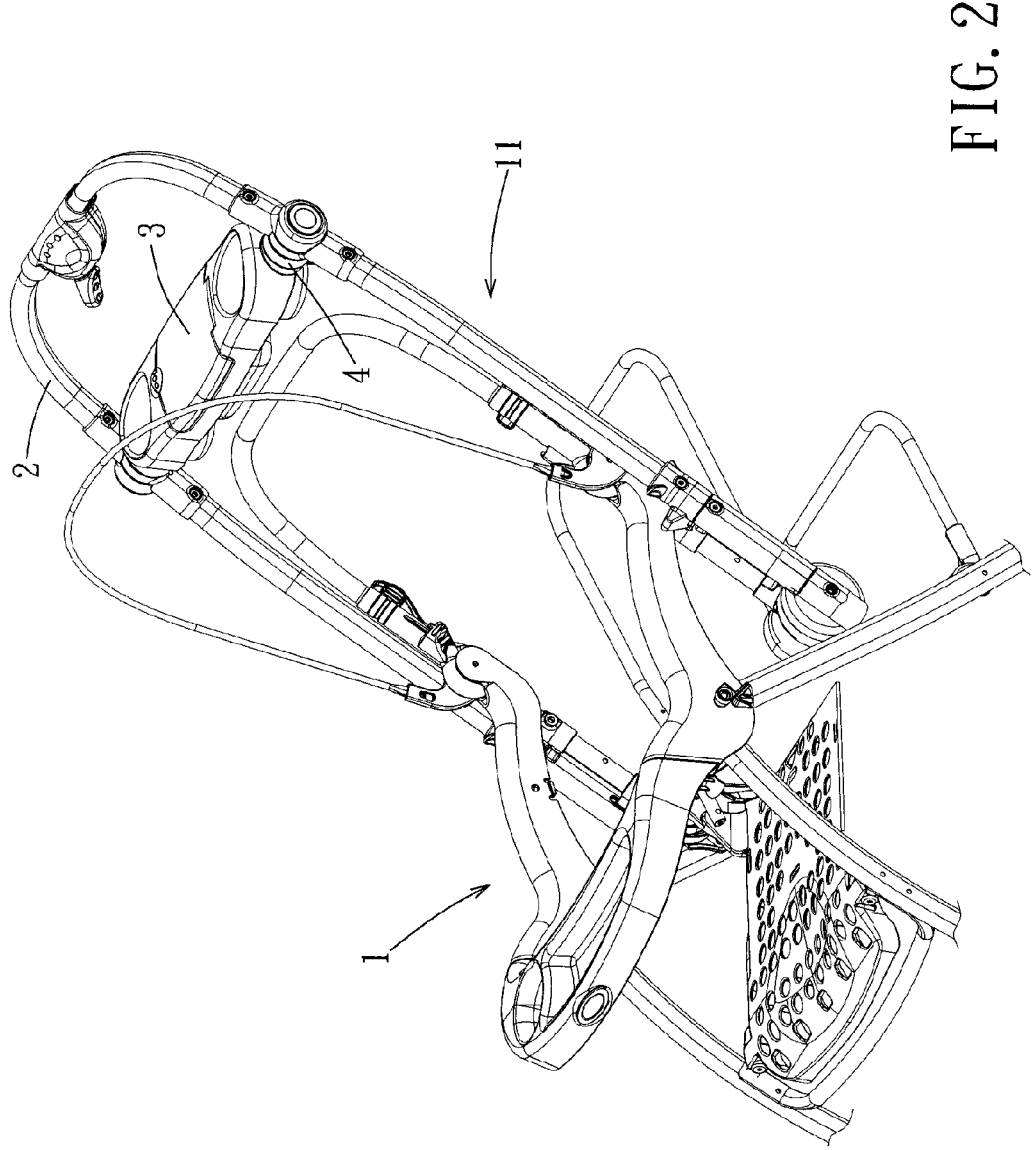
FIG. 2 is another perspective view of the stroller of the preferred embodiment with the handle at a rear inclined position.

Referring to FIGS. 1 and 2, the preferred embodiment of an adjusting mechanism 4 of the present invention is capable of connecting an article holding accessory 3 to a handle 2 of a frame 11 of a stroller 1. The handle 2 is switchable between a front inclined position (as shown in FIG. 1) and a rear inclined position (as shown in FIG. 2). Accordingly, the adjusting mechanism 4 can switch the article holding accessory 3 between a first position (as shown in FIG. 1) and a second position (as shown in FIG. 2) with respect to the handle 2. When the handle 2 is at the front inclined position and the article holding accessory 3 is at the first position, the article holding device 3 is at a substantially horizontal position of use. Similarly, when the handle 2 is at the rear inclined position and the article holding accessory 3 is at the second position, the article holding accessory 3 is also at a substantially horizontal position of use. In the present embodiment, the article holding accessory 3 is a parent tray. Preferably, the handle 2 of the preferred embodiment is an inverted U-shaped handle. The article holding accessory 3 is disposed between opposite side parts of the inverted U-shaped handle. The present invention, however, is not limited in this respect, and is applicable to a pair of independent stroller handles that are not interconnected.

Figure 3:
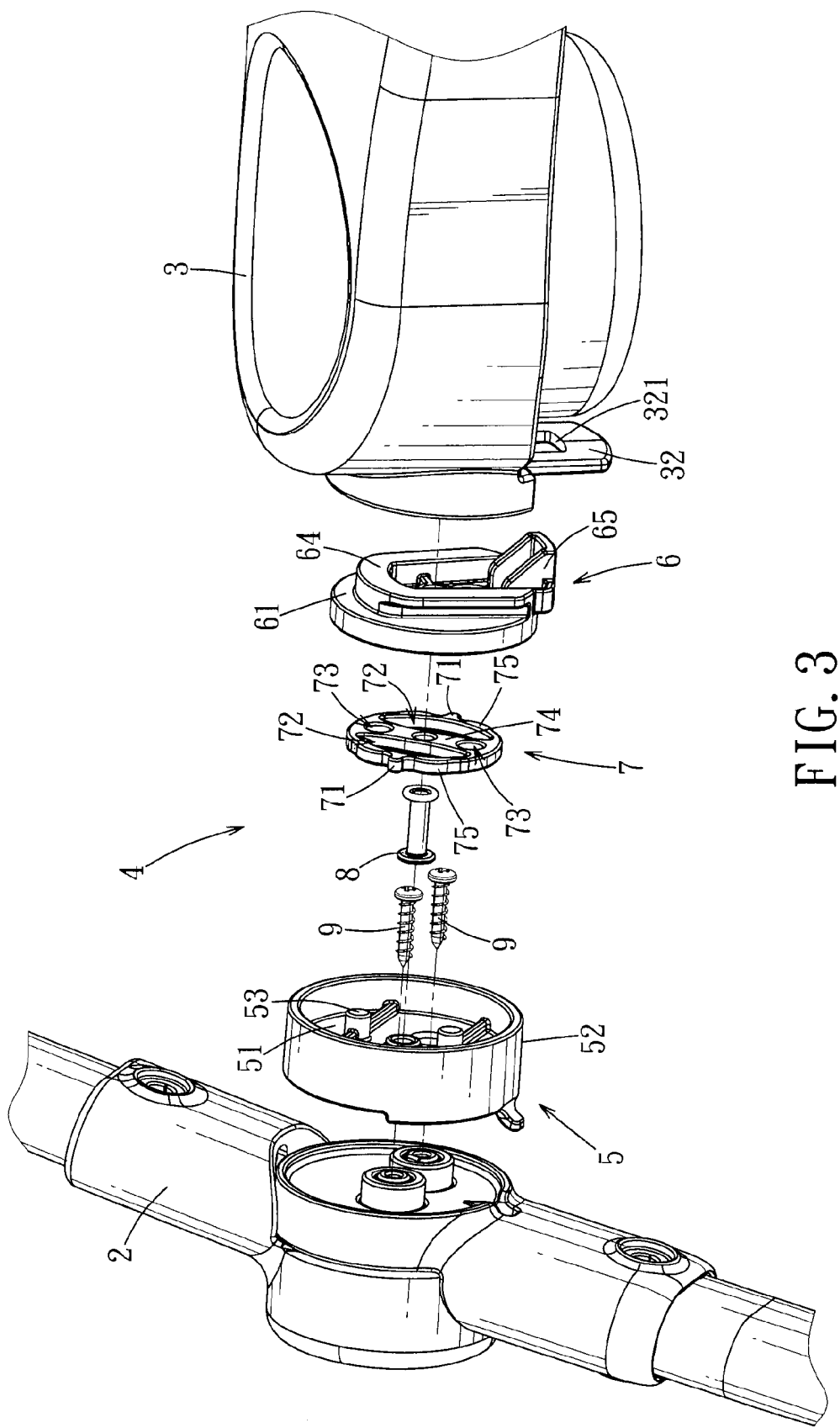
FIG. 3 is an exploded perspective view of the adjusting mechanism of the preferred embodiment of the present invention.
Figure 4:
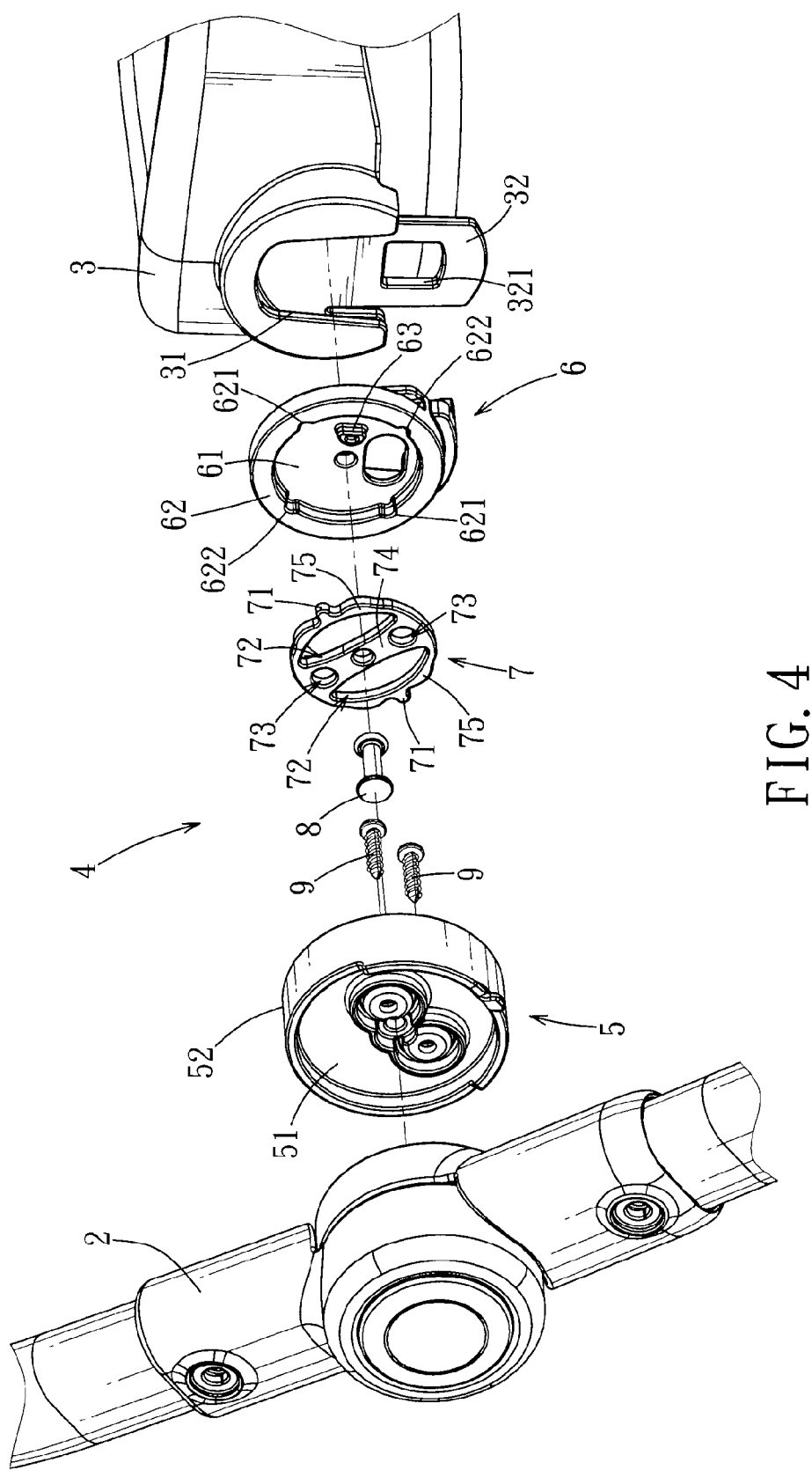
FIG. 4 is another exploded perspective view of the adjusting mechanism of the preferred embodiment viewed from another angle.
Figure 6:
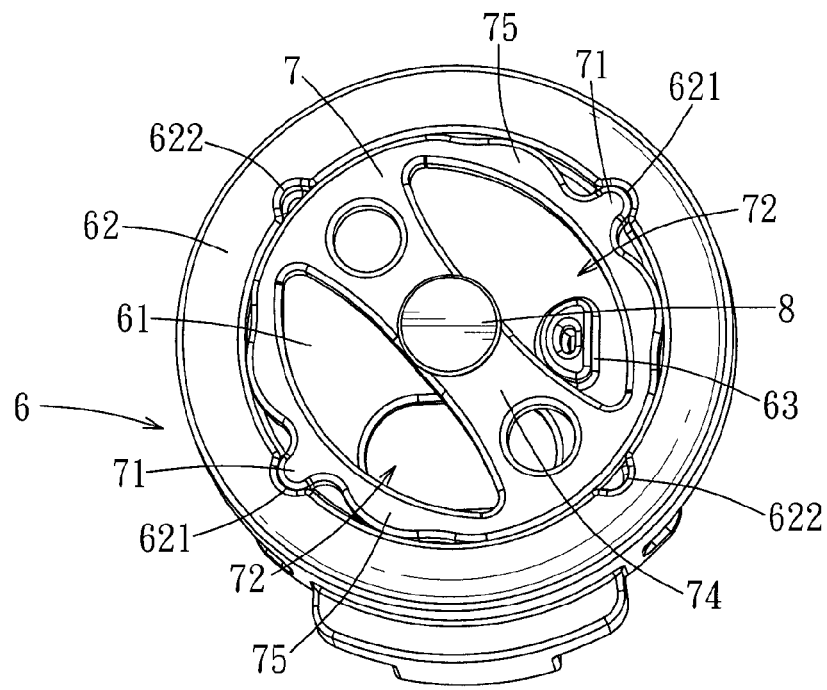
FIG. 6 is a schematic view illustrating positioning parts of a positioning plate engaged to first engaging parts of an axle ring component.

Referring to FIGS. 3, 4, and 6, each of the opposite ends of the article holding accessory 3 is provided with the adjusting mechanism 4. Each adjusting mechanism 4 includes a sleeve component 5, an axle ring component 6, and a positioning plate 7. The sleeve component 5 is disposed proximate to one side part of the handle 2 and is secured to an inner side of the handle 2 of the frame 11 by two screws 9. The axle ring component 6 is connected separably to one outer end of the article holding accessory 3 and is rotatable in the sleeve component 5.

The sleeve component 5 includes a base wall 51, a surrounding wall 52 extending from the base wall 51 toward the axle ring component 6, and two protruding pillars 53 protruding from the base wall 51 toward the axle ring component 6 and disposed inside the surrounding wall 52.

The axle ring component 6 includes a base wall 61, an annular surrounding wall 62 extending from a periphery of the base wall 61 toward the sleeve component 5, a limiting protrusion 63 extending from the base wall 61 toward the sleeve component 5, and a key member 64 disposed on another side of the base wall 61.

The surrounding wall 62 of the axle ring component 6 has an inner face formed with two first engaging parts 621 that correspond to the front inclined position of the handle 2 and two second engaging parts 622 that correspond to the rear inclined position of the handle 2. The two first engaging parts 621 are disposed at two diametrically opposite positions, while the two second engaging parts 622 are disposed at another two diametrically opposite positions. In the present embodiment, each of the first and second engaging parts 621, 622 is an engaging recess.

The key member 64 is engageable with a keyway 31 disposed at an outer end of the article holding accessory 3 such that the article holding accessory 3 is connected movably with the axle ring component 6, and such that the article holding accessory 3 can be coupled to the handle 2 of the frame 11 in a modular manner. The modular coupling allows the user to lift the article holding accessory 3 away from the handle 2.

Preferably, the axle ring component 6 has a latch member 65. A resilient piece 32 is disposed in the keyway 31. The resilient piece 32 has a latch hole 321 for engaging the latch member 65, thereby securing the article holding accessory 3. When it is desired to remove the article holding accessory 3, the resilient piece 32 is operated to remove the latch member 65 from the latch hole 321, thereby permitting removal of the article holding accessory 3.

The positioning plate 7 is coaxially secured to the sleeve component 5 and is received in the surrounding wall 62 of the axle ring component 6. The positioning plate 7 includes two positioning parts 71 disposed respectively at diametrically opposite positions of the positioning plate 7, and has a pair of limiting openings 72 for extension of the limiting protrusion 63 of the axle ring component 6 therethrough, and two holes 73 through which the protruding pillars 53 of the sleeve component 5 respectively extend.

In the present embodiment, the positioning plate 7 further includes a plate body 74 and two resilient arms 75, each of which has two ends connected to the plate body 74. The plate body 74 and each of the resilient arms 75 cooperate to define the limiting openings 72. Each of the positioning parts 71 is disposed on one side of a corresponding one of the resilient arms 75 opposite to a corresponding one of the limiting openings 72. The two holes 73 are formed in the plate body 74.

Each of the positioning parts 71 is engageable with a selected one of the first engaging parts 621 and the second engaging parts 622 of the axle ring component 6 in a radial direction with respect to an axis of rotation of the axle ring component 6. Through incorporating two positioning parts 71 into the design, the position locking of the axle ring component 6 with respect to the positioning plate 7 is made more stable.

In the present embodiment, the positioning parts 71 are engaging protrusions. Nevertheless, the design of the first and second engaging parts 621, 622 and the positioning parts 71 is not limited to that shown in the present embodiment. That is to say, the first and second engaging parts 621, 622 can be designed as engaging protrusions, and the positioning parts 71 can be designed as engaging recesses.

The two protruding pillars 53 of the sleeve component 5 are received in the corresponding holes 73 of the positioning plate 7 so as to coaxially secure the positioning plate 7 and the sleeve component 5 together such that the positioning plate 7 and the sleeve component 5 are unable to rotate with respect to each other.

Figure 5:
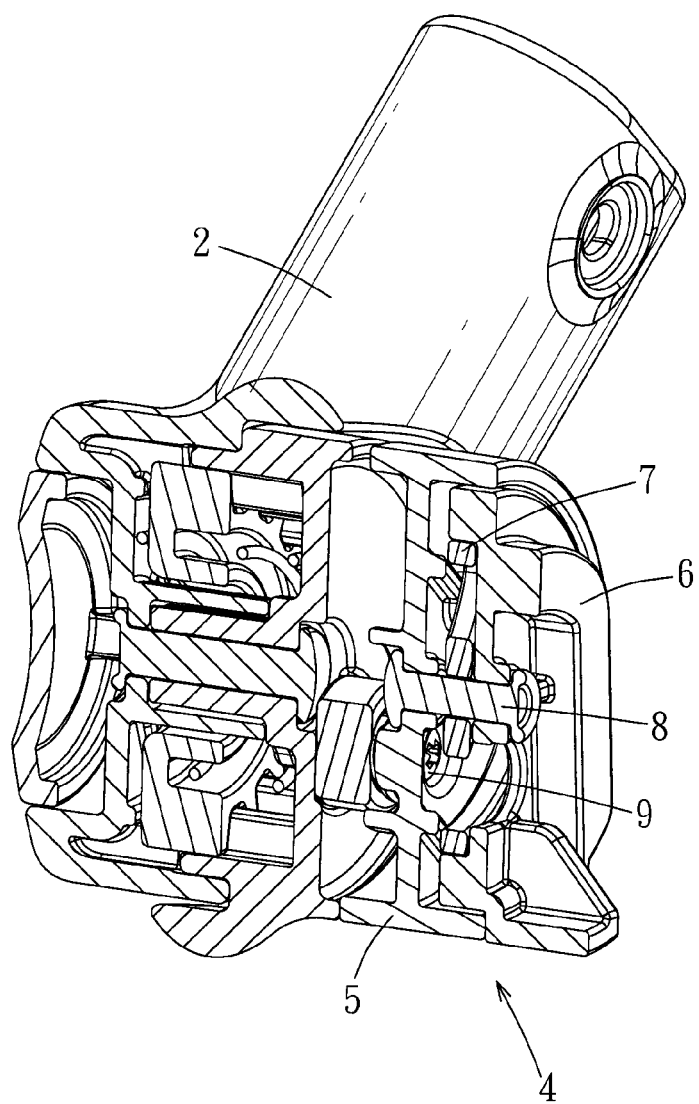
FIG. 5 is a sectional view of the adjusting mechanism of the preferred embodiment.

Referring to FIG. 5, in the present embodiment, the axle ring component 6 is coupled rotatably to the sleeve component 5 by a rivet 8.

The relation between the different positions of the handle 2 and the position of the article holding accessory 3 is described hereinafter.

Figure 8:
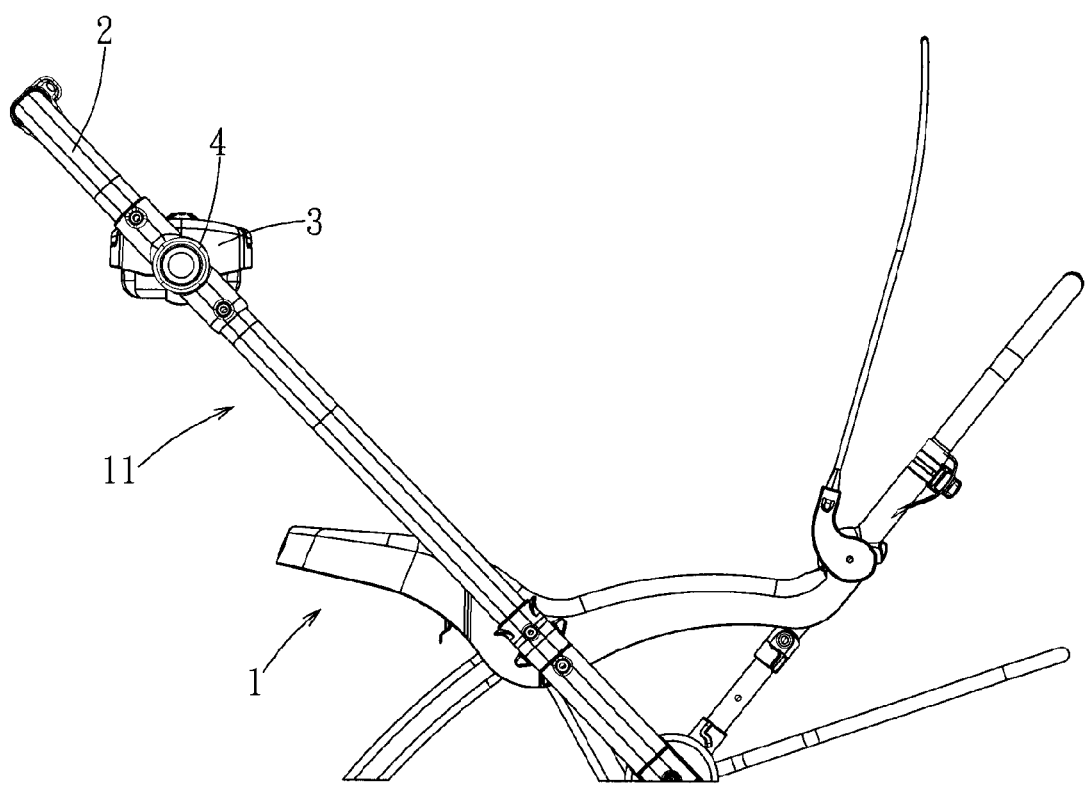
FIG. 8 is a side view illustrating the stroller of the preferred embodiment with the handle at the front inclined position.

Referring to FIGS. 6 and 8, when the handle 2 is at the front inclined position, the two positioning parts 71 of the positioning plate 7 engage the two first engaging parts 621 of the axle ring component 6, respectively, such that the article holding accessory 3 is at a substantially horizontal position of use at the first position.

Figure 7:
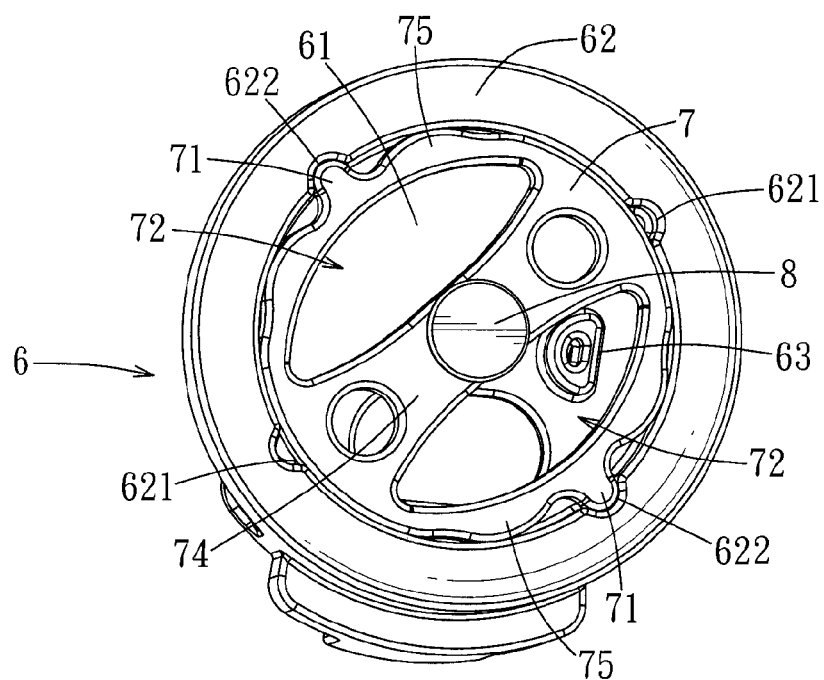
FIG. 7 is a schematic view illustrating the positioning parts of the positioning plate engaged to second engaging parts of the axle ring component.
Figure 9:
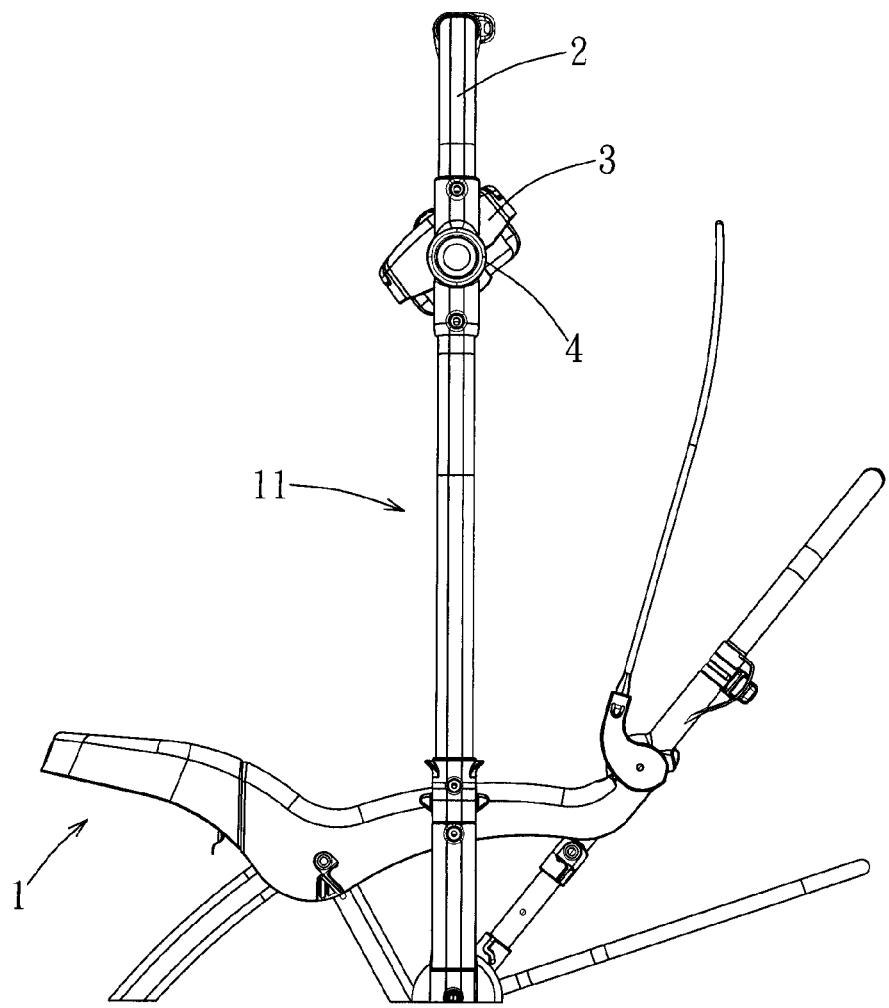
FIG. 9 is a side view illustrating the stroller of the preferred embodiment with the handle in the middle of changing positions.

Referring to FIGS. 7 and 9, in the process of adjusting the handle 2 from the front inclined position to the rear inclined position, the stroller user can rotate the article holding accessory 3 so that the axle ring component 6 rotates with respect to the positioning plate 7, which, in turn, disengages the two positioning parts 71 from the first engaging parts 621 and engages the two positioning parts 71 to the second engaging parts 622. At this state, a front side of the article holding accessory 3 is lower than a rear side thereof. It is to be noted that while the axle ring component 6 and the positioning plate 7 are rotating with respect to each other, the resilient arms 75 are adapted to deform inwardly when the positioning parts 71 disengage from the first engaging parts 621, and to restore to their original shape when the positioning parts 61 engage the second engaging parts 622.

Figure 10:
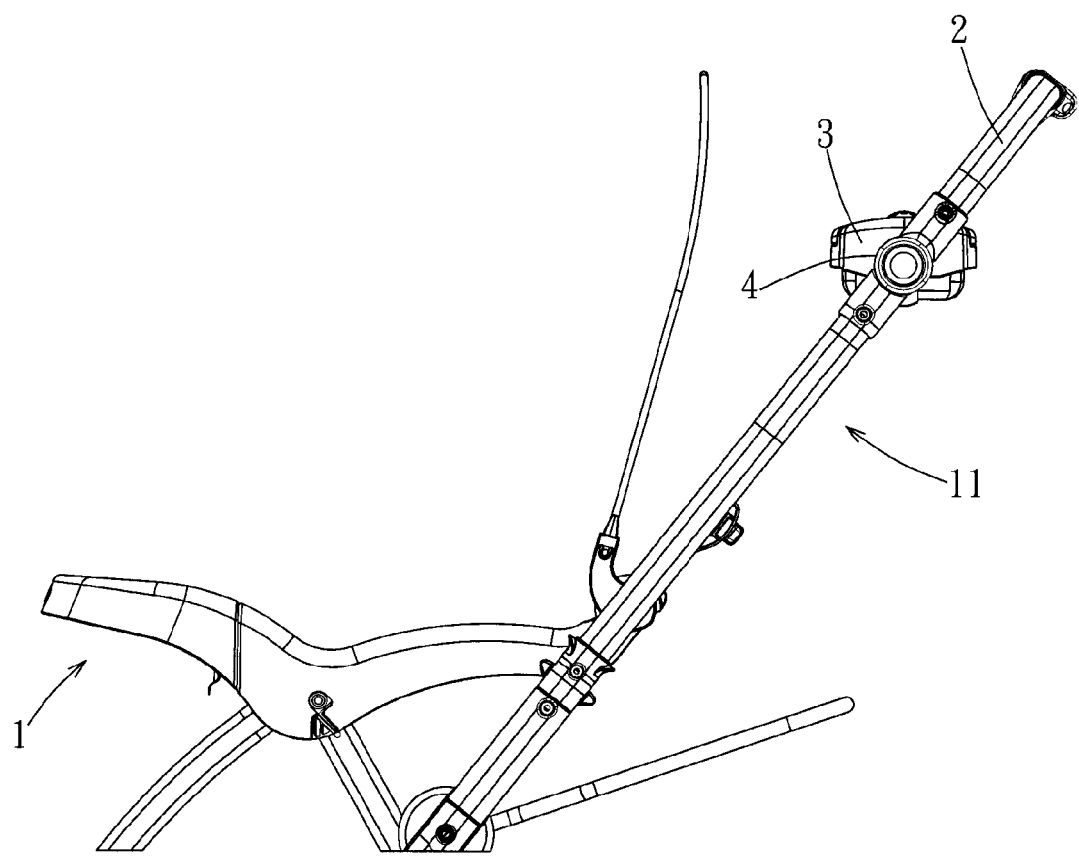
FIG. 10 is a side view illustrating the stroller of the preferred embodiment with the handle at the rear inclined position.

Referring to FIGS. 7 and 10, when the handle 2 is adjusted to the rear inclined position, the article holding accessory 3 is at a substantially horizontal position of use at the second position.

When the handle 2 is adjusted from the rear inclined position to the front inclined position, the reverse operation can adjust the article holding accessory 3 to the substantially horizontal position of use at the first position.

It is to be noted that, as shown in FIGS. 6 and 7, the two limiting openings 72 in the positioning plate 7 are substantially almond-shaped and are disposed symmetrically with respect to a diameter of the positioning plate 7. The limiting protrusion 63 of the axle ring component 6 extends through one of the limiting openings 72. When the first engaging parts 621 engage the positioning parts 71 of the positioning plate 7 to provide the substantially horizontal position of use for the article holding accessory 3 while the handle 2 is at the front inclined position, the limiting protrusion 63 abuts against one end of said one of the limiting openings 72 to prevent the article holding accessory 3 from further rotating clockwise. When the handle 2 is adjusted to the rear inclined position, the article holding accessory 3 can be rotated counterclockwise until the second engaging parts 622 engage the positioning parts 71 of the positioning plate 7. At this position, the limiting protrusion 63 abuts against the other end of said one of the limiting openings 72 to prevent the article holding accessory 3 from further rotating counterclockwise. Therefore, the limiting protrusion 63 and the limiting openings 72 cooperate to prevent the axle ring component 6 from rotating excessively, through which the article holding accessory 3 maintains the substantially horizontal position of use.

The present invention, through the arrangement of the positioning parts 71 of the positioning plate 7 that are engageable with a selected one of the first engaging parts 621 and the second engaging part 622s of the axle ring component 6, provides a substantially horizontal position of use for the article holding accessory 3 when the handle 2 is at either one of the front and rear inclined positions. In addition, the design, in which the axle ring component 6 is coupled separably to the outer end of the article holding accessory 3, allows the article holding accessory 3 to be secured to the handle 2 in a modular manner and allows the user to remove the article holding accessory 3 when desired.

Additionally, although the adjusting mechanism 4 of the preferred embodiment as described heretofore is associated with an article holding accessory 3 in the form of a parent tray, the adjusting mechanism 4, however, can also be used in association with a cup holder that is disposed at one side or two sides of the handle 2.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An adjusting mechanism comprising:
 a handle, pivotable about a pivot point thereon between a front inclined position and a rear inclined position, said front and rear inclined positions defining a pivot angle therebetween;
 an article holding accessory comprising side surfaces and a top surface, said top surface including at least one opening for receiving an article;
 a sleeve component secured to the handle at a point distal to said pivot point;
 an axle ring component connected to one of said side surfaces of the article holding accessory and connected rotatably to said sleeve component, said axle ring component comprising a base wall and an annular surrounding wall extending from said base wall, said surrounding wall comprising a first engaging part and a second engaging part separated by an angle substantially equal to said pivot angle, the base wall further including a limiting protrusion extending therefrom; and
 a positioning plate coaxially and non-rotatably secured in said sleeve component, said positioning plate having at least one positioning part formed on a periphery thereof, said at least one positioning part adapted for rotating between and engaging a selected one of said first and second engaging parts, said positioning plate further including at least one limiting opening formed radially inwardly from said at least one positioning part, said limiting opening defining an angular extent substantially equal to said pivot angle,
 wherein when the handle is in the front inclined position, said at least one positioning part engages with said first engaging part, said limiting protrusion abuts a first end of the limiting opening, and the top surface of the article holding accessory is at a substantially horizontal position, and
 wherein when the handle is in the rear inclined position, said at least one positioning part engages with said second engaging part, said limiting protrusion abuts a second end of the limiting opening opposite said first end, and the top surface of the article holding accessory is at another substantially horizontal position.

2. The adjusting mechanism as claimed in claim 1, wherein said axle ring component is connected separably to an outer end of the article holding accessory.

3. The adjusting mechanism as claimed in claim 1, wherein each of said first and second engaging parts is one of an engaging recess and an engaging protrusion, and said at least one positioning part is the other.

4. The adjusting mechanism as claimed in claim 1, wherein said first and second engaging parts are formed at an inner face of said surrounding wall.

5. The adjusting mechanism as claimed in claim 4, wherein said sleeve component further includes a protruding pillar protruding toward said axle ring component, said positioning plate being provided with a hole through which said protruding pillar extends.

6. The adjusting mechanism as claimed in claim 1, wherein said positioning plate includes a plate body and a resilient arm having two ends connected to said plate body, said plate body and said resilient arm cooperating to define said limiting opening, said at least one positioning part being disposed on one side of said resilient arm opposite to said limiting opening.

7. The adjusting mechanism as claimed in claim 1, wherein said axle ring component has one side that is away from said sleeve component and that is provided with a key member adapted for engaging a keyway in the article holding accessory.

8. The adjusting mechanism as claimed in claim 1, wherein said first engaging part comprises a pair of first engaging parts disposed at diametrically opposite positions of said positioning plate, and said second positioning part comprises a pair of second engaging parts disposed at another two diametrically opposite positions of said positioning plate.

9. The adjusting mechanism as claimed in claim 1, wherein said axle ring component is riveted to said sleeve component.

10. A stroller comprising:
a frame including a child occupying portion;
a handle pivotable about a pivot point on the frame between a front inclined position with respect to the child occupying portion of the frame, and a rear inclined position with respect to the child occupying portion of the frame, said front and rear inclined positions defining a pivot angle therebetween;
an article holding accessory comprising side surfaces and a top surface including at least one opening configured to receive an article; and
at least one adjusting mechanism including:
a sleeve component secured to said handle at a point distal to said pivot point,
an axle ring component connected to one of said side surfaces of said article holding accessory and connected rotatably to said sleeve component, said axle ring component comprising a base wall and an annular surrounding wall extending from said base wall, said surrounding wall comprising a first engaging part and a second engaging part separated by an angle substantially equal to said pivot angle, the base wall further including a limiting protrusion extending therefrom, and
a positioning plate coaxially and non-rotatably secured in said sleeve component, said positioning plate having a positioning part formed on a periphery thereof, said positioning part being rotatable between and engageable with a selected one of said first engaging part and said second engaging part with respect to an axis of rotation of said axle ring component, said positioning plate further including a limiting opening formed radially inwardly from said positioning part, said limiting opening defining an angular extend substantially equal to said pivot angle,
wherein at least one side surface of said article holding accessory connects to said handle via said at least one adjusting mechanism such that:
when the handle is in the front inclined position, said positioning part engages with said first engaging part, said limiting protrusion abuts a first end of the limiting opening, and the top surface of the article holding accessory is at a substantially horizontal position, and
when the handle is in the rear inclined position, said positioning part engages with said second engaging part, said limiting protrusion abuts a second end of the limiting opening opposite said first end, and the top surface of the article holding accessory is at another substantially horizontal position.

11. The stroller as claimed in claim 10, wherein said axle ring component is connected separably to an outer end of said article holding accessory.

12. The stroller as claimed in claim 10, wherein each of said first engaging part and said second engaging part of said axle ring component is one of an engaging recess and an engaging protrusion, and said positioning part is the other one of said engaging recess and said engaging protrusion.

13. The stroller as claimed in claim 10, wherein said first engaging part and said second engaging part are formed at an inner face of said surrounding wall.

14. The stroller as claimed in claim 13, wherein said sleeve component further includes a protruding pillar protruding toward said axle ring component, said positioning plate being provided with a hole through which said protruding pillar extends.

15. The stroller as claimed in claim 10, wherein said positioning plate includes a plate body and a resilient arm having two ends connected to said plate body, said plate body and said resilient arm cooperating to define said limiting opening, said positioning part being disposed on one side of said resilient arm opposite to said limiting opening.

16. The stroller as claimed in claim 10, wherein said axle ring component has one side that is away from said sleeve component and that is provided with a key member, said article holding accessory having a keyway for engaging said key member.

17. The stroller as claimed in claim 10, wherein said axle ring component has two of said first engaging parts that are respectively disposed at two diametrically opposite positions, and two of said second engaging parts that are respectively disposed at another two diametrically opposite positions, said positioning plate having two of said positioning parts that are disposed at two diametrically opposite positions of said positioning plate.

18. The stroller as claimed in claim 10, wherein said axle ring component is riveted to said sleeve component.

19. The stroller as claimed in claim 10, wherein said axle ring component has a latch member, said article holding accessory having a resilient piece, said resilient piece having a latch hole, said latch member engaging said latch hole when said article holding accessory is disposed on said handle.

* * * * *